United States Patent
Hayashi

(10) Patent No.: US 9,542,131 B2
(45) Date of Patent: Jan. 10, 2017

(54) IMAGE FORMING APPARATUS FOR RETRIEVING PRINT DATA USING AN ADDRESS OF THE STORED PRINT DATA

(71) Applicant: Hiroyuki Hayashi, Ichinomiya (JP)

(72) Inventor: Hiroyuki Hayashi, Ichinomiya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/038,103

(22) Filed: Sep. 26, 2013

(65) Prior Publication Data

US 2014/0185087 A1 Jul. 3, 2014

(30) Foreign Application Priority Data

Dec. 28, 2012 (JP) ................................ 2012-287136

(51) Int. Cl.
*G06F 3/12* (2006.01)

(52) U.S. Cl.
CPC ............. *G06F 3/122* (2013.01); *G06F 3/1236* (2013.01); *G06F 3/1271* (2013.01); *G06F 3/1288* (2013.01)

(58) Field of Classification Search
CPC ....... G06F 3/1271; G06F 3/122; G06F 3/1268
USPC ...................................................... 358/1.15
See application file for complete search history.

(56) References Cited

U.S. PATENT DOCUMENTS

| | | | |
|---|---|---|---|
| 7,639,381 B2* | 12/2009 | Shima ................ | H04N 1/32545 358/1.1 |
| 2002/0016836 A1 | 2/2002 | Suzuki et al. | |
| 2003/0169449 A1* | 9/2003 | Iida .................... | H04N 1/00209 358/1.15 |
| 2006/0047730 A1 | 3/2006 | Hibino et al. | |

(Continued)

FOREIGN PATENT DOCUMENTS

JP 09-325654 A 12/1997
JP 2001101091 A 4/2001

(Continued)

OTHER PUBLICATIONS

English language machine translation of JP 2001-101091 A to Satake et al.*

(Continued)

*Primary Examiner* — Eric A Rust
(74) *Attorney, Agent, or Firm* — Scully, Scott, Murphy & Presser, P.C.

(57) ABSTRACT

A printing apparatus which communicates with a data providing apparatus includes a printing mechanism which executes a printing operation. The printing apparatus receives a number of print copies, and acquires print data from the data providing apparatus by executing a request processing of transmitting to the data providing apparatus a data request of the print data, and a reception processing of receiving the print data from the data providing apparatus. When executing a printing operation of N copies (N is an integer of 2 or larger), the acquiring executes, for each copy, the request processing and the reception processing to (Continued)

acquire the print data from the data providing apparatus while executing the request processing of the print data of M-th copy (M is an integer of 2 or larger and N or smaller) after the reception processing of the print data of (M−1)-th copy is completed.

11 Claims, 10 Drawing Sheets

(56) References Cited

U.S. PATENT DOCUMENTS

| | | | |
|---|---|---|---|
| 2006/0139688 A1* | 6/2006 | Aoki | G06Q 30/04 358/1.15 |
| 2007/0058196 A1 | 3/2007 | Nagahara et al. | |
| 2007/0179995 A1* | 8/2007 | Prahlad | G06F 17/30528 |
| 2010/0238504 A1 | 9/2010 | Kanno et al. | |
| 2011/0317214 A1* | 12/2011 | Hamada et al. | 358/1.15 |
| 2012/0120438 A1* | 5/2012 | Sato | 358/1.15 |

FOREIGN PATENT DOCUMENTS

| | | |
|---|---|---|
| JP | 2002014780 A | 1/2002 |
| JP | 2005-078490 A | 3/2005 |
| JP | 2006-065446 A | 3/2006 |
| JP | 2007109212 A | 4/2007 |
| JP | 2010-224826 A | 10/2010 |

OTHER PUBLICATIONS

Japanese Notification of Reasons for Refusal dated Jan. 5, 2016 received in related application JP 2012-287136 together with an English language translation.

* cited by examiner

THIRD ILLUSTRATIVE EMBODIMENT

FOURTH ILLUSTRATIVE EMBODIMENT

IMAGE FORMING APPARATUS FOR RETRIEVING PRINT DATA USING AN ADDRESS OF THE STORED PRINT DATA

CROSS-REFERENCE TO RELATED APPLICATION

This application claims priority from Japanese Patent Application No. 2012-287136, filed on Dec. 28, 2012, the entire subject matter of which is incorporated herein by reference.

TECHNICAL FIELD

Aspects of the present invention relate to a printing apparatus configured to communicate with a storage apparatus storing therein print data via the Internet.

BACKGROUND

JP-A-2002-14780 discloses a printing apparatus. The printing apparatus acquires print data from a server apparatus. The server apparatus divides the print data and transmits divided print data to the printing apparatus.

SUMMARY

The above-described printing apparatus does not assume a case of printing multiple copies. Accordingly, an aspect of the present invention provides a technique of appropriately printing multiple copies.

According to an illustrative embodiment, there is provided a printing apparatus configured to communicate with a data providing apparatus via the Internet. The printing apparatus includes a printing mechanism configured to execute a printing operation by using data, a processor, and memory storing computer-readable instructions. The computer-readable instructions, when executed by the processor, cause the printing apparatus to perform: receiving a number of print copies; acquiring print data from the data providing apparatus by executing a request processing of transmitting to the data providing apparatus a data request for the printing apparatus to acquire the print data, and a reception processing of receiving the print data from the data providing apparatus in response to the data request; and providing the acquired print data to the printing mechanism. When executing a printing operation of N copies (N is an integer of 2 or larger), the acquiring executes, for each copy, the request processing and the reception processing to acquire the print data from the data providing apparatus while executing the request processing of the print data of M-th copy (M is an integer of 2 or larger and N or smaller) after the reception processing of the print data of (M−1)-th copy is completed.

In the above configuration, the print data is acquired for each copy and the acquired print data is provided to the printing mechanism. According to this configuration, the printing apparatus can appropriately execute the printing operation of N copies even though the print data is not kept being stored in the printing apparatus while the printing operation of N copies is executed.

According to another illustrative embodiment of the present invention, there is provided a communication system including a data providing apparatus configured to provide print data, and a printing apparatus configured to communicate with the data providing apparatus via the Internet. The printing apparatus includes a printing mechanism configured to execute a printing operation by using data, a first processor, and first memory storing first computer-readable instructions. The first computer-readable instructions, when executed by the first processor, cause the printing apparatus to perform: receiving a number of print copies; acquiring print data from the data providing apparatus by executing a request processing of transmitting to the data providing apparatus a data request for the printing apparatus to acquire the print data, and a reception processing of receiving the print data from the data providing apparatus in response to the data request; and providing the acquired print data to the printing mechanism. When executing a printing operation of N copies (N is an integer of 2 or larger), the acquiring executes, for each copy, the request processing and the reception processing to acquire the print data from the data providing apparatus while executing the request processing of the print data of M-th copy (M is an integer of 2 or larger and N or smaller) after the reception processing of the print data of (M−1)-th copy is completed.

In this configuration, the print data is acquired for each copy and the acquired print data is provided to the printing mechanism. According to this configuration, the printing apparatus can appropriately execute the printing operation of N copies even though the print data is not kept being stored in the printing apparatus while the printing operation of N copies is executed.

In the meantime, a control method, a computer program and a non-transitory computer-readable recording medium storing the computer program for the printing apparatus are also novel and useful. Also, a control method, a computer program and a non-transitory computer-readable recording medium storing the computer program for the data providing apparatus are also novel and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

First Illustrative Embodiment

Configuration of Communication System

Figure 1:
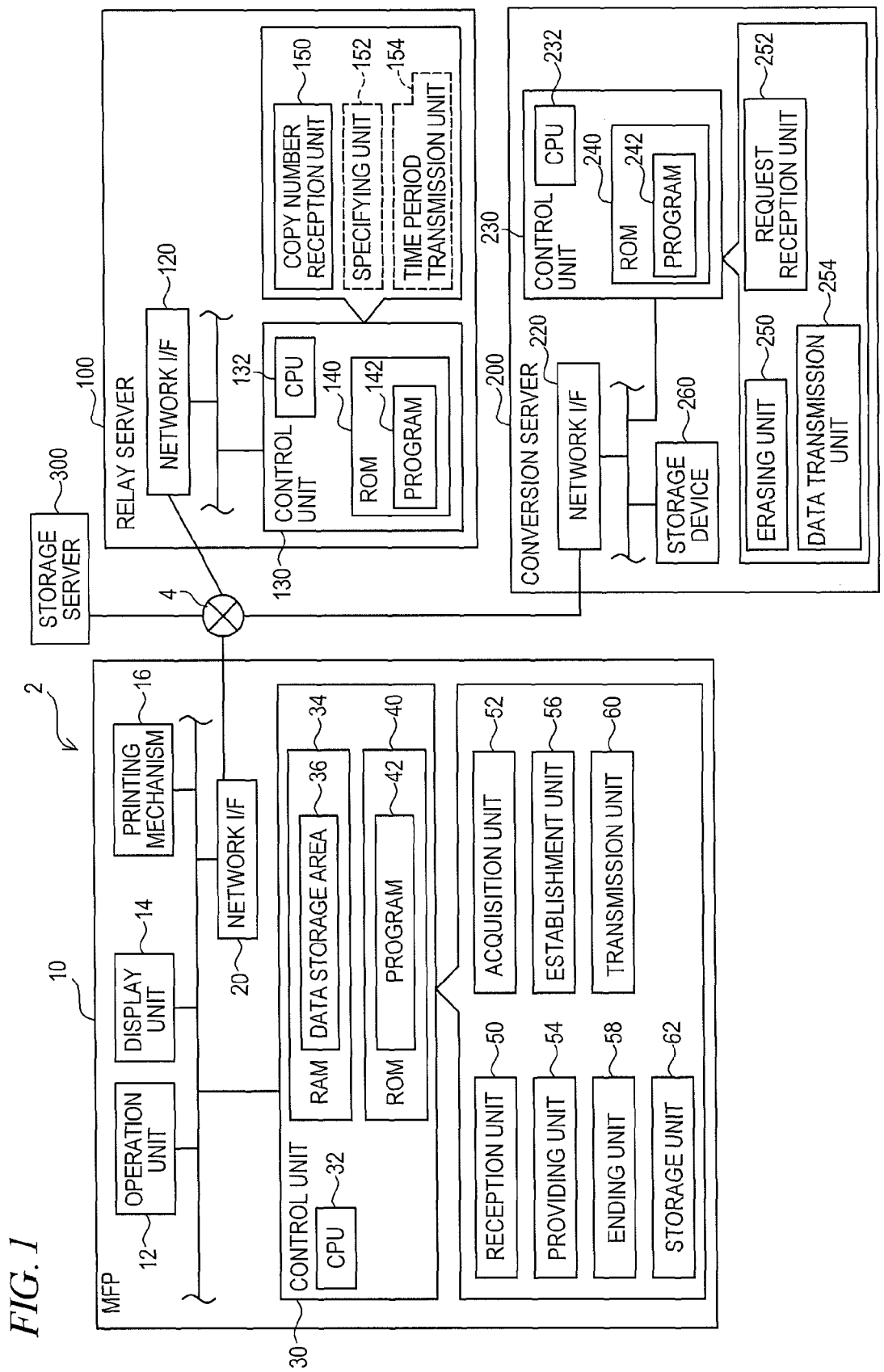
FIG. 1 shows an exemplary configuration of a communication system.

As shown in FIG. 1, a communication system 2 has a multi-function peripheral (MFP) 10, a relay server 100, a conversion server 200 and a storage server 300. The MFP 10, the relay server 100, the conversion server 200 and the storage server 300 can perform communication with each other via the Internet 4.

(Configuration of MFP 10)

The MFP 10 has an operation unit 12, a display unit 14, a printing mechanism 16, a network interface 20 and a control unit 30. The MFP 10 has printing, scan, FAX functions and the like. The respective units 12 to 30 are connected to a bus line (a reference numeral thereof is omitted). The operation unit 12 has a plurality of keys. A user can input various instructions to the MFP 10 by operating the operation unit 12. The display unit 14 is a display for displaying a variety of information. The printing mechanism 16 has a printing mechanism such as an inkjet method, a laser method and the like and executes a printing operation according to an instruction from the control unit 30. The network interface 20 is connected to the Internet 4.

The control unit 30 has a CPU 32, a RAM 34 and a ROM 40. The CPU 32 executes a variety of processing according to programs 42 stored in the ROM 40, so that functions of respective units 50 to 62 are implemented.

The ROM 40 stores therein the programs 42. The RAM 34 has a data storage area 36. The data storage area 36 is an area for temporarily storing data, which is received from an external apparatus (for example, the conversion server 200).

(Configuration of Relay Server 100)

The relay server 100 relays communication between the MFP 10 and an external apparatus (for example, the storage server 300) when the MFP 10 acquires data to be printed from the external apparatus. The relay server 100 has a network interface 120 and a control unit 130. The respective units 120, 130 are connected to a bus line (a reference numeral thereof is omitted). The network interface 120 is connected to the Internet 4. The communications between the respective devices in the communication system 2 are performed using the Internet 4.

The control unit 130 has a CPU 132 and a ROM 140. The CPU 132 executes a variety of processing according to programs 142 stored in the ROM 140, so that functions of respective units 150 to 152 are implemented. The ROM 140 stores therein the programs 142. In the meantime, in a fourth illustrative embodiment, a specifying unit 152 and a time period transmission unit 154 are provided to the relay server 100, and the relay server 100 of the first illustrative embodiment may not have the specifying unit 152 and the time period transmission unit 154.

(Configuration of Conversion Server 200)

The conversion server 200 is a server for converting data to be printed into print data of a format (for example, jpeg (Joint Photographic Experts Group)) that can be interpreted by the MFP 10, when the MFP 10 acquires the data to be printed from the external apparatus (for example, the storage server 300). The conversion server 200 has a network interface 220, a control unit 230 and a storage device 260. The respective units 220, 230, 260 are connected to a bus line (a reference numeral thereof is omitted). The network interface 220 is connected to the Internet 4.

The control unit 230 has a CPU 232 and a ROM 240. The CPU 232 executes a variety of processing according to programs 242 stored in the ROM 240, so that functions of respective units 250 to 254 are implemented. The ROM 240 stores therein the programs 242. The relay server 100 and the conversion server 200 are servers that are provided by a vendor of the MFP 10.

The storage device 260 stores therein print data. The storage device 260 has an HDD (Hard Disk Drive). The storage device 260 further has a timer that measures a time period after the print data is stored in the storage device 260. When the time measured by the timer exceeds a predetermined storing time period (for example, 1 hour), the print data that is a measuring target is erased from the storage device 260. Thereby, it is possible to prevent a plurality of data from being accumulated in the storage device 260.

(Configuration of Storage Server 300)

The storage server 300 has a function of storing data that is uploaded from the external apparatus (for example, the MFP 10) and a function of providing data stored in the storage server 300 to the external apparatus. The storage server 300 is a known cloud server such as 'Evernote (registered trademark)', 'Google (registered trademark) Docs', 'PICASA (registered trademark)', 'Facebook (registered trademark)' and the like.

Figure 2:
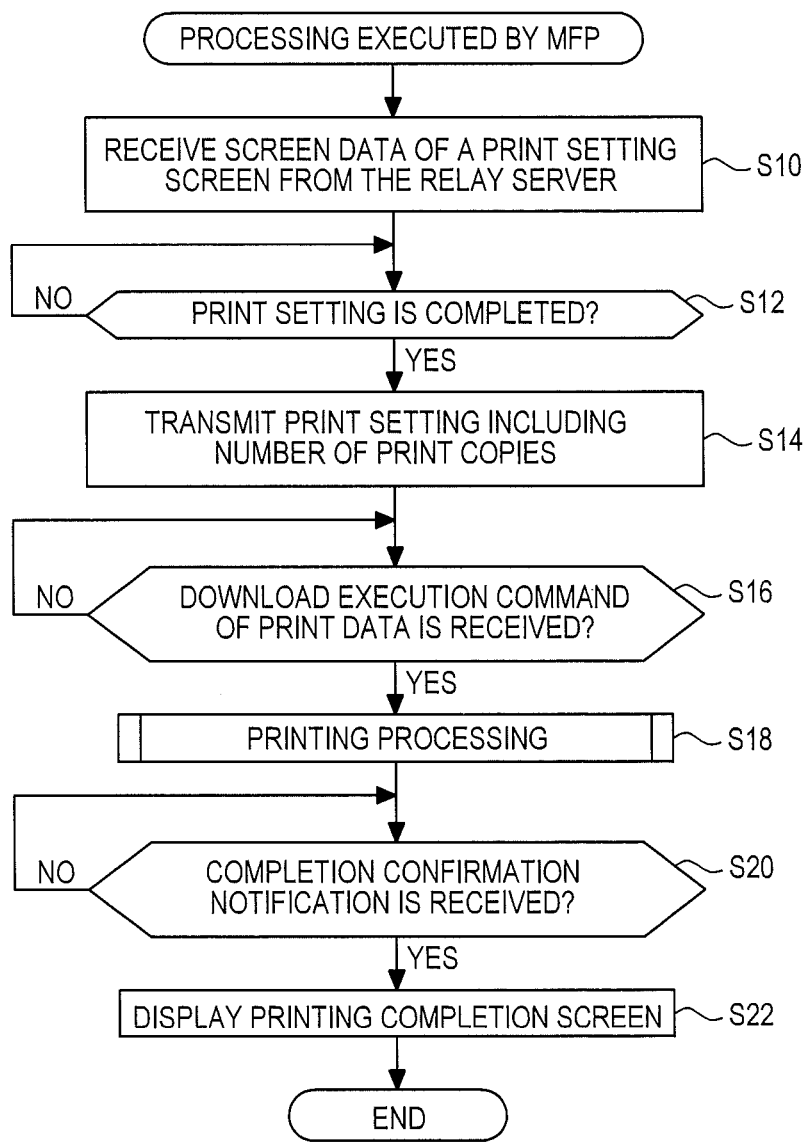
FIG. 2 is a flowchart of processing that is executed by an MFP.
Figure 3:
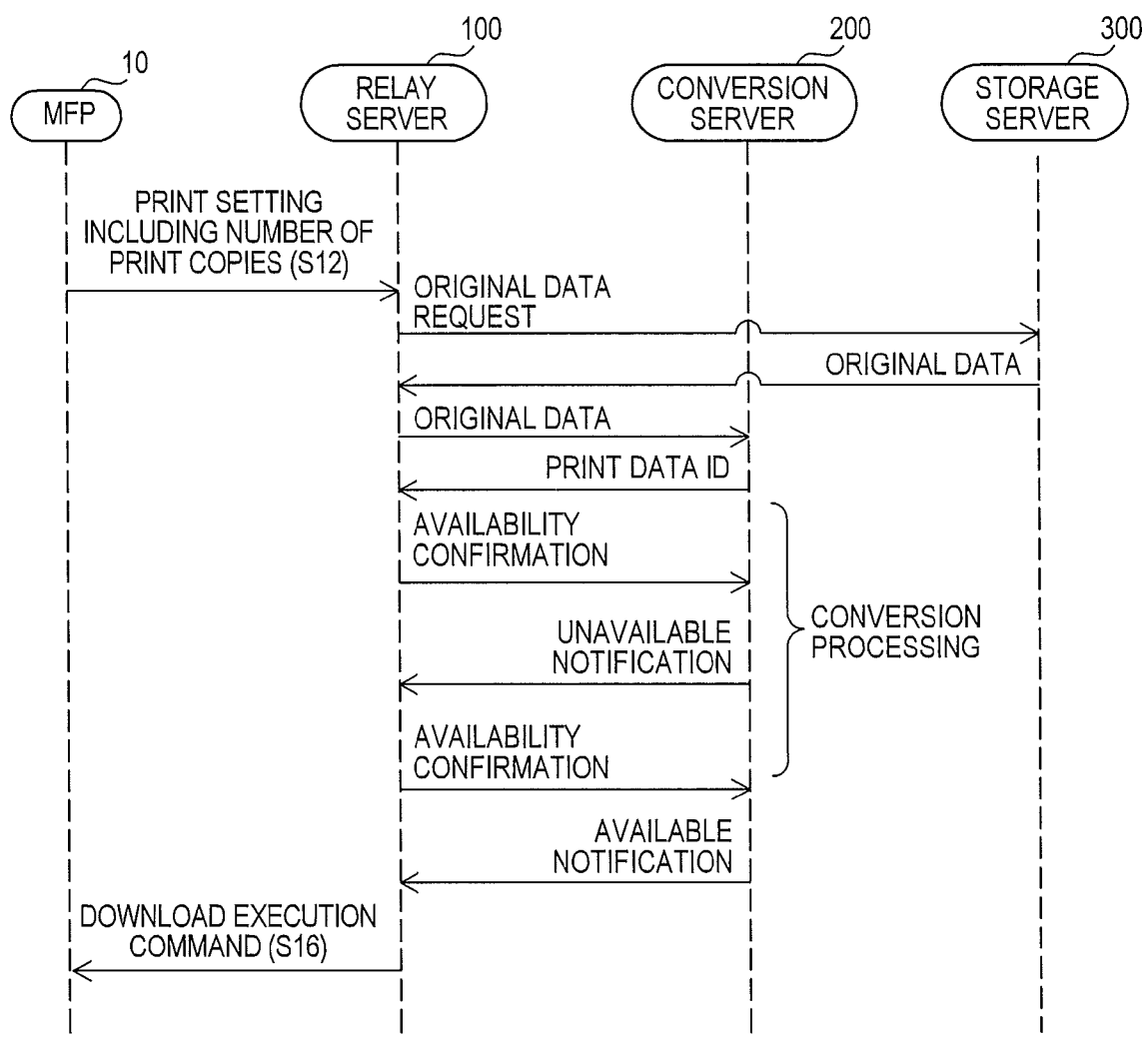
FIG. 3 is a sequence diagram of processing that is executed by respective devices of the communication system.

(Processing Executed by MFP 10: FIG. 2)

The processing that is executed by the MFP 10 is described with reference to FIG. 2. When a user of the MFP 10 executes a predetermined screen acquisition operation with the operation unit 12, a reception unit 50 transmits a screen request for requesting the relay server 100 to transmit screen data, which indicates a print setting screen, to the relay server 100 via the Internet 4. The screen acquisition operation is an operation for inputting a URL (Uniform Resource Locator) of the screen data, for example. The screen request includes the URL of the screen data. The processing of FIG. 2 starts when the screen request is transmitted. In S10, the reception unit 50 receives screen data from the relay server 100. When the screen data is received, the reception unit 50 displays a print setting screen, which is expressed by the screen data, on the display unit 14 according to a browser program (not shown) stored in the ROM 40.

The user can input a print setting in the print setting screen by operating the operation unit 12. The print setting includes a URL of original data to be printed, a number of print copies, and a print sheet size. When the user completes the input of the print setting, the user operates the operation unit 12 to thus execute a setting completion operation (for example, an operation of a 'setting completion' button in the print setting screen). Thereby, the reception unit 50 receives the print setting, which includes the number of print copies.

In S12, the reception unit 50 monitors whether the setting completion operation is executed. When the setting completion operation is executed, the control unit 30 determines that the print setting is completed (YES in S12) and proceeds to S14. In S14, the control unit 30 transmits the print setting input in S12 to the relay server 100. The print setting includes the copy number information indicating the number of print copies. A copy number reception unit 150 of the relay server 100 receives the print setting, which includes the copy number information.

Then, in S16, an acquisition unit 52 monitors whether a download execution command of the print data is received from the relay server 100. When a download execution command is received (YES in S16), the control unit 30 executes printing processing (refer to FIG. 4) in S18. When the printing processing ends, the control unit 30 monitors in S20 whether a completion confirmation notification is received from the relay server 100, as a response to a completion notification transmitted to the relay server 100 in the printing processing of S18. When the completion confirmation notification is received (YES in S20), the control unit 30 displays a printing completion screen on the display unit 14 in S22, and the processing ends.

(Error Detection Processing Executed by MFP 10)

Separately from the processing of FIG. 2, while the MFP 10 is ON, the control unit 30 of the MFP 10 executes error detection processing of monitoring whether the MFP 10 shifts to an error state from a normal state. That is, the error detection processing may be executed in parallel with the processing of FIG. 2. The error state herein refers to a state where the MFP 10 cannot receive data from the external apparatus (for example, the conversion server 300).

For example, when the data to be printed is received at a state where the printing mechanism 16 cannot execute a printing operation since there is no print sheet, there is no toner, a cover of the printing mechanism 16 is opened and the like, for example, data that is not printed is accumulated in the data storage area 36. In this case, an available capacity of the data storage area 36 would become insufficient, so that the data cannot be received. Also, the error state includes a state where the MFP 10 cannot perform communication with the external apparatus. When the MFP 10 shifts to the error state from a normal state where it can receive the data, the control unit 30 switches an error flag in the RAM 34 from OFF to ON. In the meantime, the normal state herein refers to a state other than the error state.

Meanwhile, in a modified embodiment, when the printing mechanism 16 cannot execute a printing operation, the control unit 30 may determine that the MFP 10 shifts from the normal state to the error state, irrespective of the available capacity of the data storage area 36, and switch the error flag from OFF to ON.

(Processing in Communication System Before Printing Processing is Executed)

Subsequently, the processing is described which is executed by the respective devices 10, 100, 200, 300 of the communication system 2 after the MFP 10 transmits the print setting in S14 of FIG. 2 until the printing processing is executed in S18 of FIG. 2. When the MFP 10 transmits the print setting (S14 of FIG. 2), the relay server 100 receives the print setting. The print setting includes the information indicating the number of print copies and the URL of the original data to be printed. The relay server 100 transmits to the storage server 300 an original data request for the relay server 100 to acquire the original data. The original data request includes the URL of the original data. When the original data request is received, the storage server 300 transmits original data that is specified by the URL of the original data to the relay server 100.

When the original data is received from the storage server 300, the relay server 100 transmits the original data 100 to the conversion server 200. The conversion server 200 determines whether the received original data is data of a format that can be interpreted by the MFP 10. When it is determined that the original data is data of a format that can be interpreted by the MFP 10, the conversion server 200 stores the original data in the storage device 260. On the other hand, when it is determined that the original data is not data of a format that can be interpreted by the MFP 10, the conversion server 200 converts the original data into data of a format that can be interpreted by the MFP 10 and stores the same in the storage device 260. In the below, the data that is stored in the storage device 260 is referred to as print data. In order to identify the print data, the conversion server 200 determines a print data ID. The conversion server 200 transmits the determined print data ID to the relay server 100.

When the print data ID is received from the conversion server 200, the relay server 100 periodically transmits an availability confirmation signal for confirming whether the print data can be downloaded until an available notification (which will be described later) is received. When the conversion processing is not completed, the conversion server 200 transmits an unavailable notification, which indicates that the print data cannot be downloaded, to the relay server 100, as a response to the availability confirmation signal. On the other hand, when the conversion processing is completed, the conversion server 200 transmits an available notification, which indicates that the print data can be downloaded, to the relay server 100, as a response to the availability confirmation signal. In the meantime, when the conversion processing is not executed, i.e., when the original data is data of a format that can be interpreted by the MFP 10, the conversion server 200 transmits an available notification to the relay server 100, as a response to the availability confirmation signal.

When the available notification is received, the relay server 100 transmits a download execution command to the MFP 10, and the MFP 10 receives the download execution command (YES in S16 of FIG. 2). Thereby, the MFP 10 starts the printing processing (S18 of FIG. 2).

(Printing Processing Executed by MFP 10)

Subsequently, the printing processing that is executed by the MFP 10 is described with reference to FIG. 4. When the number of print copies received in S12 of FIG. 2 is 2 or more copies, the MFP 10 receives and prints the print data for each of the copies. For example, when the number of print copies is N (N is an integer of 2 or larger), the MFP 10 executes processing for receiving print data N times.

In S50, the control unit 30 determines whether the number of acquisition times of the print data by the MFP 10 is smaller than the number of print copies (N, in this example) received in S12 of FIG. 2. Specifically, each time when the print data is acquired one time (i.e., each time when the entire print data is one time acquired by acquiring a plurality of partial data, which will be described later), the control unit 30 increases an acquisition completion counter in the RAM 34 by '1'. The control unit 30 determines whether a value of the acquisition completion counter is smaller than N. When the number of acquisition times of the print data is N or larger (NO in S50), the control unit 30 transmits a completion notification, which indicates that the printing processing is completed, to the relay server 100 in S96, and the printing processing ends. According to this configuration, the MFP 10 can notify the relay server 100 that the acquisition of the print data of the N copies is completed. Thereby, the relay server 100 can erase the print data ID and the like stored in the relay server 100.

When the number of acquisition times of the print data is smaller than N (YES in S50), the acquisition unit 52 transmits a URL request for the MFP 10 acquiring a URL, which can designate the print data stored in the storage device 260, to the relay server 100 in S52. Then, in S54, the acquisition unit 52 receives a URL of the print data from the relay server 100. The URL of the print data is configured by combining a URL of the conversion server 200 (for example, 'http://server1/path1') and the print data ID (for example, 'conv_id=printdata1') (for example, 'http://server1/path1?conv_id=printdata1').

Then, in S56, an establishment unit 56 executes establishment processing for establishing a TCP session between the MFP 10 and the conversion server 200. Specifically, the establishment unit 56 first designates the URL of the conversion server 200 received in S54 as a transmission destination and transmits a SYN packet thereto. When the SYN packet is received, the conversion server 200 transmits a SYN/ACK packet to the MFP 10 that is a source of the SYN packet. When the SYN/ACK packet is received from the conversion server 200, the establishment unit 56 transmits an ACK packet to the conversion server 200. Thereby, a TCP session is established between the MFP 10 and the conversion server 200.

Then, in S58, the acquisition unit 52 transmits a partial data request for the MFP 10 receiving partial data, which is a part of the print data, to the conversion server 200. The acquisition unit 52 transmits the partial data request to the conversion server 200 by using the TCP session established in S56. The partial data request includes the URL of the print data, starting point information, which indicates a starting point of the partial data in the print data, and size information indicating a data size of the partial data. Specifically, the partial data request is configured by combining the URL of the print data (for example, 'http://server1/path1?conv_id=printdata1'), the starting point information (for example, 'first=0 k') and the size information (for example, 'size=100 k') (for example, 'http://server1/path1?conv_id=printdata1?first=0&size=100 k'). In the meantime, the starting point information 'first=0 k' indicates that a starting point of the partial data is 0 kB-th data of the print data. Also, the size information 'size=100 k' indicates that a data size of the requested partial data is 100 kB. According to this configuration, the conversion server 200 can appropriately specify the partial data.

Meanwhile, in this illustrative embodiment, a case where the data size of the partial data is X kB (X is an integer of 1 or larger) is described. Meanwhile, in a modified embodiment, the partial data request may include ending point information (for example, 'end=100 k') indicating an ending point of the partial data. In this modified embodiment, the starting point information and the ending point information are the size information indicating the data size of the partial data.

Then, in S60, the acquisition unit 52 monitors whether a response to the partial data request is received from the conversion server 200. The conversion server 200 transmits a response to the partial data request to the MFP 10 by using the TCP session established in S56. When the size information included in the partial data request coincides with the data size that should be transmitted by the conversion server 200, the control unit 230 of the conversion server 200 executes processing for transmitting the partial data. Specifically, the control unit 230 divides the requested partial data with respect to each predetermined Y kB (for example, Y=8) and transmits the same to the MFP 10. In the meantime, when the size information included in the partial data request does not coincide with the data size that should be transmitted by the conversion server 200, the control unit 230 transmits size information, which indicates a data size that should be requested as the partial data, to the MFP 10.

When the size information is received as a response to the partial data request (YES in S60), the acquisition unit 52 proceeds to S62. On the other hand, when a part of the partial data is received as a response to the partial data request (NO in S60), the acquisition unit 52 proceeds to S64. In S62, an ending unit 58 executes ending processing for ending the TCP session established in S56.

Specifically, the ending unit 58 first transmits a FIN packet to the conversion server 200 by using the TCP session established in S56. When the FIN packet is received, the conversion server 200 transmits a FIN/ACK packet to the MFP 10 by using the TCP session established in S56. When the FIN/ACK packet is received from the conversion server 200, the ending unit 58 transmits an ACK packet to the conversion server 200 by using the TCP session established in S56. Thereby, the TCP session is disconnected between the MFP 10 and the conversion server 200, and the TCP session ends. The state where the TCP session ends between the MFP 10 and the conversion server 200 can be also said that the TCP session is closed between the MFP 10 and the conversion server 200. When the processing of S62 ends, the control unit returns to S56. In S56 after the processing of S62 is executed, the establishment unit 56 newly establishes a TCP session. In S58, a new partial data request including the size information received in S60 is transmitted to the conversion server 200. Meanwhile, in a modified embodiment, the processing of S62 may be skipped. That is, a new partial data request including the size information received in S60 may be transmitted to the conversion server 200 in S58, without ending the TCP session established in S56.

In S64, the acquisition unit 52 receives data of Y kB from the conversion server 200 by using the TCP session established in S56. A storage unit 62 stores the received data of Y kB in the data storage area 36. Then, in S66, the acquisition unit 52 calculates a data size Z byte of the data received from the conversion server 200. Then, in S68, a providing unit 54 determines whether data to be used for printing of one print sheet is stored in the data storage area 36. When data to be used for printing of one print sheet is stored in the data storage area 36 (YES in S68), the providing unit 54 provides the data stored in the data storage area 36 to the printing mechanism 16 in S70 and proceeds to S72. Meanwhile, in a modified embodiment, the providing unit 54 may determine in S68 whether data capable of printing one band is stored in the data storage area 36. In particular, when the printing mechanism 16 is a printing mechanism of a laser method, the providing unit may determine whether data to be used for printing of one print sheet is stored in the data storage area 36, and when the printing mechanism 16 is a printing mechanism of an inkjet method, the providing unit may determine whether data capable of printing one band is stored in the data storage area 36.

After the processing of S70, the providing unit 54 erases the data provided to the printing mechanism 16 from the data storage area 36. Thereby, the storage unit 62 can store the data received in S64 next time in the area of the data storage area 36, in which the data provided to the printing mechanism 16 has been stored. According to this configuration, it is not necessary to store the entire print data in the data storage area 36. As a result, the capacity of the RAM 34 can be smaller.

On the other hand, when data to be used for printing of one print sheet is not stored in the data storage area 36 (NO in S68), the control unit skips over processing of S70 and proceeds to S72. In S72, the control unit 30 determines whether an error flag is ON or not. When the error flag is OFF, i.e., the MFP 10 is at the normal state (NO in S72), the control unit proceeds to S74. On the other hand, when the error flag is ON, i.e., the MFP 10 is at the error state (YES in S72), the control unit proceeds to S82.

When the MFP 10 is at the normal state (NO in S72), the acquisition unit 52 determines in S74 whether the reception of the partial data requested in S58 is completed. Specifically, the acquisition unit 52 determines whether the value Z calculated in S66 is smaller than X. When Z is smaller than X, the acquisition unit 52 determines that the reception of the partial data is not completed (NO in S74) and returns to S64. The acquisition unit 52 executes the processing of acquiring the partial data from the conversion server 200 by using the TCP session established in S56.

On the other hand, when Z is not smaller than X, the acquisition unit 52 determines that the reception of the partial data is completed (YES in S74) and the ending unit 58 ends the TCP session established in S56 (S76). The processing of S76 is the same as S62. In S78, the acquisition unit 52 determines whether the acquisition of the print data is completed. Specifically, when information indicating that the reception of the print data is completed is received from the conversion server 200, the acquisition unit 52 determines that the reception of the print data is completed (YES in S78), and a transmission unit 60 transmits a storing time period reset command to the conversion server 200 in S80. The storing time period reset command is a command for causing the conversion server 200 to reset the timer, which measures the time period for which the print data is stored in the storage device 260. Thereby, the time period for which the print data is stored in the storage device 260 can be extended. According to this configuration, each time when the print data of one copy is acquired with the MFP 10, the time period for which the print data is stored in the storage device 260 can be extended. In the meantime, when the information indicating that the reception of the print data is completed is not received from the conversion server 200, the acquisition unit 52 determines that the reception of the print data is not completed (NO in S78) and returns to S56.

When returning to S50 after the processing of S80, the control unit 30 executes the processing of S52 to S94 so as to newly acquire print data from the conversion server 200. The control unit 30 executes the processing of S52 to S94 as the same number of times as the number of print copies received in S12 of FIG. 2. That is, when executing the printing of N copies (N is an integer of 2 or larger), the control unit 30 acquires the print data for each copy (YES in S78) while the control unit 30 acquires the print data of (M−1)-th copy (M is an integer of 2 or larger and N or smaller) (YES in S78) and then transmits the partial data request for acquiring the print data of M-th copy (S58).

Also, before the acquisition of the print data of M-th copy is completed, the providing unit 54 provides the print data of (M−1)-th copy to the printing mechanism 16. The acquisition unit 52 acquires the print data of M-th copy after providing the print data of (M−1)-th copy to the printing mechanism 16.

Also, when the acquisition of the print data of one copy is completed (YES in S78), the acquisition unit 52 newly transmits a URL request for the MFP 10 acquiring a URL, which can designate the print data stored in the storage device 260, to the relay server 100. That is, each time when the print data of one copy is acquired, the acquisition unit 52 transmits a URL request for the MFP 10 to acquire a URL, which can designate the print data, to the relay server 100. For example, when a URL of the print data includes a character string that is temporally changed, such as time stamp, the URL of the print data may be changed during the acquisition of the print data. In this case, the print data cannot be repeatedly acquired using the URL of the print data acquired in S54. According to the configuration of this illustrative embodiment, each time when the print data is received, the URL of the print data is newly received. Therefore, even when the URL of the print data is changed, the MFP 10 can acquire the print data.

On the other hand, when the MFP 10 is at the error state (YES in S72), the control unit 30 determines in S82 whether the error flag is OFF or not. In the meantime, the determination in S82 is executed when a predetermined time period (for example, 1 minute) elapses after the MFP 10 becomes at the error state. When the error flag is OFF, i.e., the MFP 10 is at the normal state (YES in S82), the control unit proceeds to S88. On the other hand, when the error flag is ON, i.e., the MFP 10 is at the error state (NO in S82), the control unit proceeds to S84. In S84, the establishment unit 56 executes establishment processing of establishing a TCP session that is used for transmission (refer to S86) of a heartbeat signal. The establishment processing of S84 is the same as that of S56. Meanwhile, in S84, the establishment unit 56 establishes another TCP session, irrespective of whether the TCP session established in S56 is kept. Then, in S86, the transmission unit 60 transmits a heartbeat signal to the conversion server 200 by using the TCP session established in S84 and returns to S82.

On the other hand, when the MFP 10 is at the normal state (YES in S82), the control unit 30 determines in S88 whether data can be received, using the TCP session established in S56. Specifically, when an available area for storing data is secured in the data storage area 36 after the MFP 10 shifts from the error state to the normal state, the control unit 30 transmits a reception possible signal, which indicates that data can be received, to the conversion server 200 by using the TCP session established in S56. When the reception possible signal is received, the conversion server 200 transmits data of the partial data requested in S58, which has not been transmitted yet to the MFP 10. In this case, the acquisition unit 52 acquires the data in S64.

In the meantime, when the partial data is not received (NO in S88) even though the reception possible signal is transmitted to the conversion server 200, the establishment unit 56 tries the same establishment processing as S56 (S90). In the meantime, the case where a result of the determination in S88 is NO includes a case where the TCP session established in S56 ends and a case where the MFP 10 has already completed the reception of the partial data.

Then, in S92, the control unit 30 determines in S90 whether the TCP session can be established. For example, until the MFP 10 shifts to the error state and then shifts to the normal state, i.e., while the processing from S82 to S86 is repeatedly executed, when the conversion server 200 becomes at a state where it cannot perform communication, the TCP session cannot be established.

Specifically, in S92, when the MFP 10 cannot receive a response to a SYN packet in the establishment processing of S90, the control unit 30 determines that the TCP session cannot be established (NO in S92), and the printing processing ends. On the other hand, when the establishment processing of S90 is completed, the control unit 30 determines that the TCP session can be established (YES in S92) and proceeds to S94.

In S94, the acquisition unit 52 transmits a partial data request for the MFP 10 to receive data of the partial data of X kB, which has not been received yet, i.e., partial data of X-Z kB to the conversion server 200 by using the TCP session established in S90. In the meantime, when X−Z=0, the control unit proceeds to S76.

The control unit 30 repeatedly executes the reception processing (S64 to S74) of receiving a part of the partial data, thereby receiving the partial data. Also, the acquisition unit 52 repeatedly executes the request processing (S58) of requesting the partial data and the reception processing (S56 to S78) of the partial data, thereby acquiring the print data.

(Processing Executed by Conversion Server 200)

Subsequently, the processing that is executed by the conversion server 200 is described with reference to FIG. 5. This processing starts when the original data is received from the relay server 100. In S100, the control unit 230 stores the print data based on the original data in the storage device 260.

Then, in S102, a request reception unit 252 monitors whether the partial data request is received from the external apparatus such as the MFP 10. When the partial data request is received (YES in S102), a data transmission unit 254 starts transmission processing of transmitting the partial data in S104 and proceeds to S106. Meanwhile, in S102, when the size information included in the received partial data request does not coincide with the data size that should be transmitted by the conversion server 200, the data transmission unit 254 transmits the size information, which indicates a data size that should be requested as the partial data, to the external apparatus that is a transmission source of the partial data request. In S102, the request reception unit 252 monitors whether the partial data request is newly received from the external apparatus. That is, when the partial data request including the size information, which indicates the data size that should be transmitted by the conversion server 200, is received, the request reception unit 252 determines YES in S102. In S104, the processing corresponding to S64 to S78 of FIG. 4 is executed. In the meantime, when the partial data request is not received (NO in S102), the control unit skips over S104 and proceeds to S106.

The processing of S106 to S110 is executed in parallel with the transmission processing of S104. In S106, the control unit 230 determines whether to change and store the time period for which the print data has been stored in the storage device 260. Specifically, when the heartbeat signal (refer to S86 of FIG. 4) or storing time period reset command (S80 of FIG. 4) is received from the MFP 10, the control unit 230 determines that the storing time period should be changed (YES in S106) and proceeds to S108. In S108, the control unit 230 changes the storing time period by resetting the timer, which measures the time period for which the print data is stored, and proceeds to S110.

On the other hand, when the heartbeat signal (refer to S86 of FIG. 4) or storing time period reset command (S80 of FIG. 4) is not received from the MFP 10, the control unit 230 determines that the storing time period should not be changed (NO in S106) and proceeds to S110. In S110, an erasing unit 250 determines whether the time period measured by the timer exceeds the storing time period. When the time period measured by the timer does not exceed the storing time period (NO in S100), the control unit returns to S102. On the other hand, when the time period measured by the timer exceeds the storing time period (YES in S100), the erasing unit 250 erases the print data from the storage device 260 in S112, and the processing ends. According to this configuration, the print data can be suppressed from being accumulated in the conversion server 200.

(Case where MFP 10 Shifts to Error State)

Subsequently, the processing of the respective devices 10, 100, 200, 300 is described with reference to FIG. 6 in a case where the MFP 10 shifts from the normal state to the error state during the reception of the partial data. When the MFP 10 transmits a URL request (S52 of FIG. 4), the relay server 100 receives the URL request. The relay server 100 transmits, as a response to the URL request, a URL of the print data including a URL of the conversion server 200 and print data ID to the MFP 10.

Figure 4:
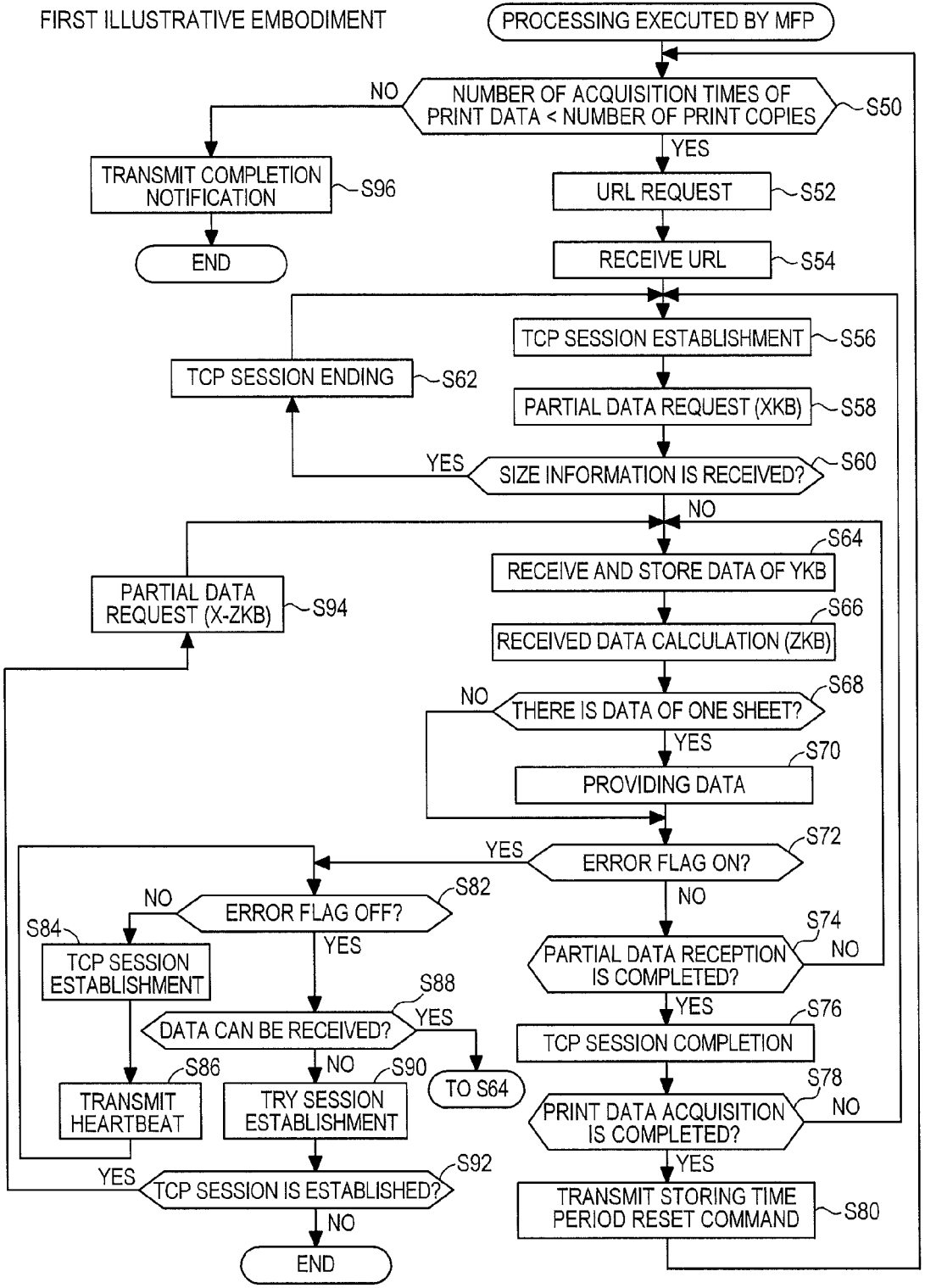
FIG. 4 is a flowchart of printing processing that is executed by the MFP of a first illustrative embodiment.

When the URL of the print data is received (S54 of FIG. 4), the MFP 10 establishes a session SE1, which is a TCP session, between the MFP 10 and the conversion server 200 (S56 of FIG. 4). Then, the MFP 10 transmits a partial data request to the conversion server 200 by using the session SE1 (S58 of FIG. 4). The partial data request includes size information indicating 50 kB. The 50 kB that are a data size indicated by the size information included in the partial data request are different from 100 kB that are a data size of the partial data to be transmitted by the conversion server 200. The conversion server 200 transmits the size information, which indicates 100 kB, to the MFP 10. Meanwhile, in a modified embodiment, before transmitting the partial data request, the MFP 10 may acquire a data size of the partial data to be requested from the conversion server 200.

When the size information is received from the conversion server 200 (YES in S60 of FIG. 4), the MFP 10 ends the session SE1 (S62 of FIG. 4). According to this configuration, the MFP 10 can appropriately end the session SE1. Then, the MFP 10 newly establishes a session SE2, which is a TCP session, between the MFP 10 and the conversion server 200 (S56 of FIG. 4). Then, the MFP 10 transmits a partial data request to the conversion server 200 by using the session SE2 (S58 of FIG. 4). According to this configuration, when transmitting a partial data request, the MFP 10 can appropriately establish the session SE2.

The partial data request includes size information indicating 100 kB. According to this configuration, the MFP 10 can request the partial data of a data size, which should be transmitted by the conversion server 200, from the conversion server 200. As a result, the MFP 10 does not have to request a plurality of partial data and to receive the same until the print data is acquired, which should be performed when a data size of the partial data is too small. Also, it is possible to reduce time until the MFP 10 receives one partial data, which is caused when a data size of the partial data is too large.

The conversion server 200 transmits the partial data, in response to the partial data request. The conversion server 200 transmits the partial data of 100 kB while dividing it into 8 kB. Each time when the data of 8 kB is received, the MFP 10 stores the same in the data storage area 36 (S64 of FIG. 4). In the meantime, each time when the data of 8 kB is stored, the MFP 10 checks an available capacity of the data storage area 36 and transmits a reception possible signal, which indicates that the data of 8 kB can be received, to the conversion server 200. When the reception possible signal is received from the MFP 10, the conversion server 200 newly transmits the data of 8 kB to the MFP 10.

When the error flag is changed from OFF to ON (YES in S72 of FIG. 4), the MFP 10 establishes a session SE3, which is a new TCP session, between the MFP 10 and the conversion server 200 (S84 of FIG. 4). Thereby, the session SE2 and the session SE3 are established between the MFP 10 and the conversion server 200. Then, the MFP 10 transmits a heartbeat signal to the conversion server 200 by using the session SE3 (S86 of FIG. 4). According to this configuration, the session SE3 for transmitting a heartbeat signal can be established. When the heartbeat signal is received (S106 of FIG. 5), the conversion server 200 resets the timer (S108 of FIG. 5). Therefore, a situation where the print data is erased from the conversion server 200 while the MFP 10 is at the error state can be avoided. The MFP 10 repeatedly transmits the heartbeat signal until the MFP 10 shifts from the error state to the normal state.

When the error flag is changed from ON to OFF (YES in S82 of FIG. 4), the MFP 10 executes the ending processing of ending the session SE3. Then, the MFP 10 transmits a reception possible signal to the conversion server 200 by using the session SE2. When the reception possible signal is received, the conversion server 200 divides data of the partial data, which has not been transmitted yet, into data of 8 kB and transmits the same to the MFP 10 by using the session SE2. Since the MFP 10 can receive data by using the session SE2 already established, the MFP does not have to newly establish a TCP session. Since the session SE2 is kept, the MFP 10 can receive data of the partial data, which has not been received yet, without newly transmitting a partial data request.

In the meantime, when data of one print sheet is stored in the data storage area 36 (YES in S68 of FIG. 4), the MFP 10 provides data to the printing mechanism 16 (S70 of FIG. 4). Also, each time when the MFP 10 receives the data of 8 kB, the MFP repeats the processing of storing the same in the data storage area 36 several times (S64 of FIG. 4). When the reception of the partial data is completed (YES in S74), the MFP 10 ends the session SE2. Then, when it is determined that the reception of the print data is not completed (NO in S78 of FIG. 4), the MFP 10 newly establishes a session SE4, which is a TCP session, between the MFP 10 and the conversion server 200 (S56 of FIG. 4). Then, the MFP 10 transmits a partial data request to the conversion server 200 by using the session SE4. The MFP 10 transmits the partial data request including the size information received from the conversion server 200. According to this configuration, even when the MFP 10 shifts from the normal state to the error state while the print data is being received, the MFP 10 can appropriately acquire the print data after the MFP 10 shifts from the error state to the normal state.

When all the print data of one copy is acquired (YES in S78 of FIG. 4), the MFP 10 transmits a storing time period reset command to the conversion server 200 (S80 of FIG. 4). When the storing time period reset command is received, the conversion server 200 resets the timer measuring a time period for which the print data is stored in the storage device 260 (S108 of FIG. 5).

After the reception of the print data of one copy is completed, when it is determined that the number of acquisition times of the print data is smaller than N (YES in S50 of FIG. 4), the MFP 10 transmits a URL request to the relay server 100 (S52 of FIG. 4) and receives the URL of the print data from the relay server 100. The MFP 10, the relay server 100 and the conversion server 200 repeatedly execute the processing until the print data of N copies is received by the MFP 10. According to this configuration, even when the printing apparatus shifts from the normal state to the error state while the print data is being received, the printing apparatus can appropriately acquire the print data after shifting from the error state to the normal state. When the reception of the print data of N copies is completed (NO in S50 of FIG. 4), the MFP 10 transmits a completion notification to the relay server 100. When the completion notification is received, the relay server 100 transmits a completion confirmation notification to the MFP 10.

Figure 6:
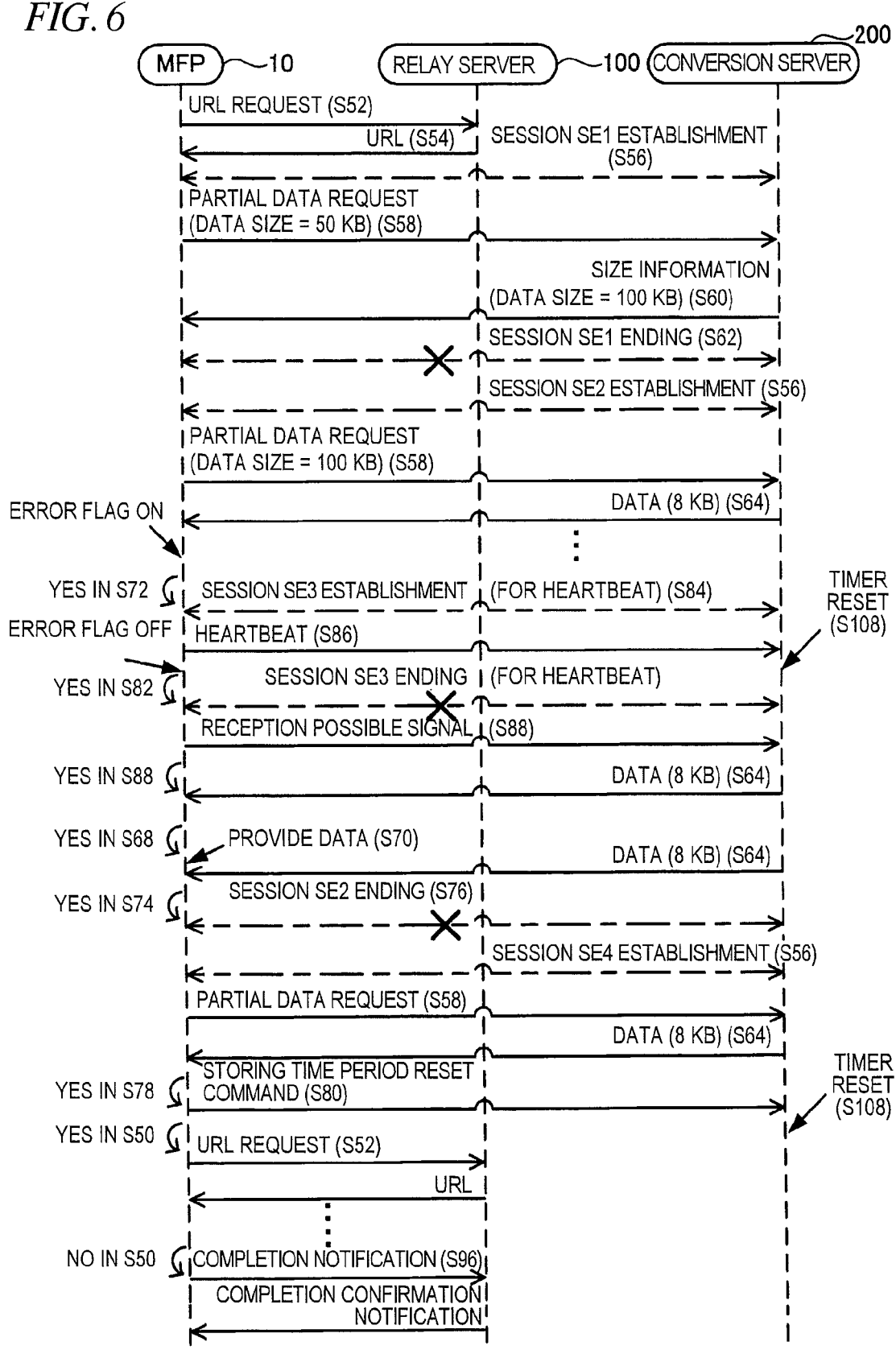
FIG. 6 is a sequence diagram of processing that is executed by respective devices of the communication system in a case where the MFP shifts to an error state during execution of printing processing.

In FIG. 6, after the error flag is switched from ON to OFF (YES in S82 of FIG. 4), the MFP 10 transmits the reception possible signal to the conversion server 200 by using the session SE2, thereby receiving data of the partial data, which has not been received yet.

Figure 7:
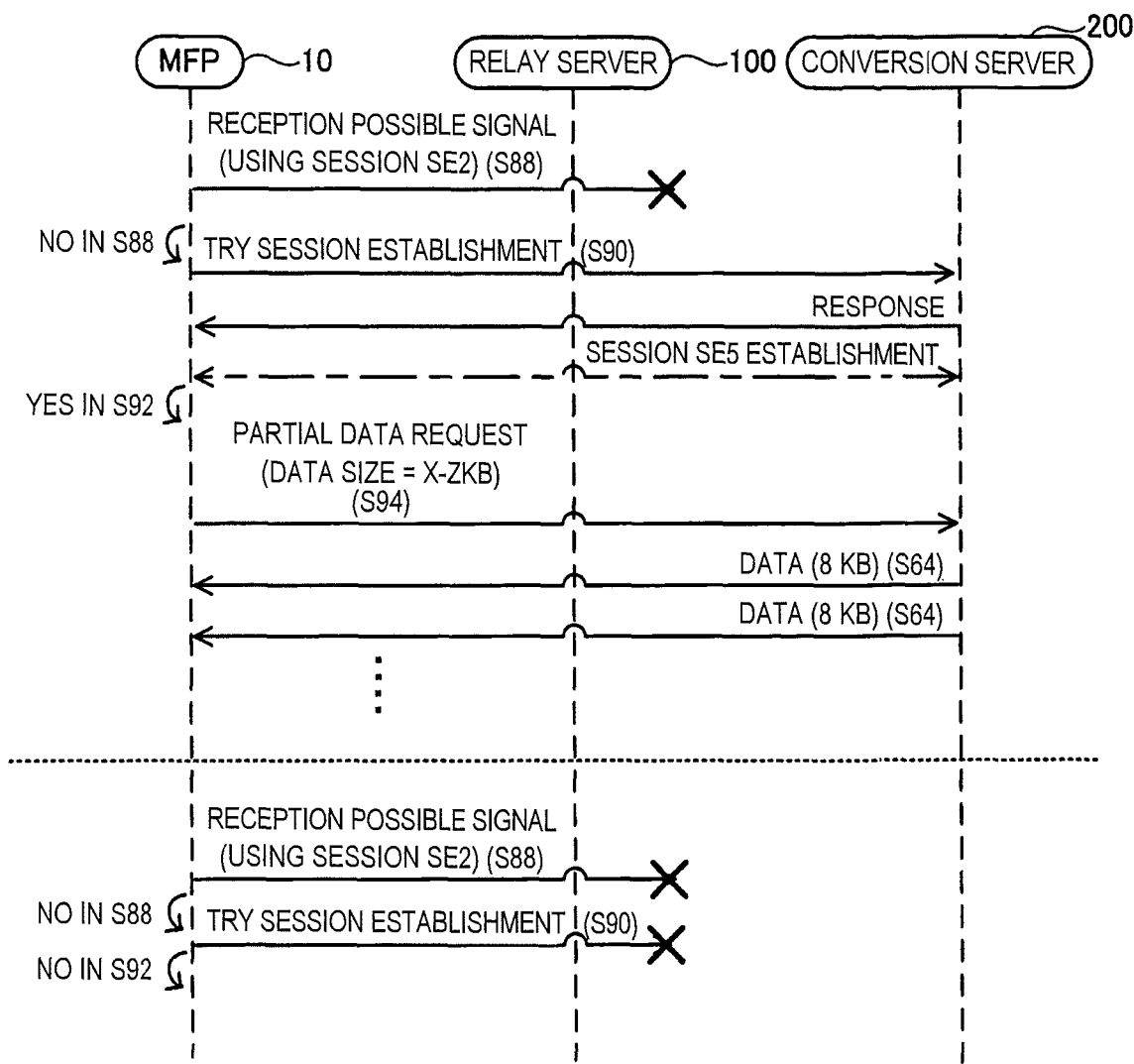
FIG. 7 is a sequence diagram of processing that is executed by respective devices of the communication system when session establishment processing is tried after the MFP shifts from the error state to a normal state.

In the meantime, the session SE2 may be forcibly ended after the MFP 10 shifts from the normal state to the error state until the MFP 10 returns to the normal state. For example, a communication device such as router interposed between the MFP 10 and the conversion server 200 may cut off the session SE2. In this case, as shown in FIG. 7, after the error flag is switched from ON to OFF (YES in S82 of FIG. 4), the MFP 10 cannot transmit the reception possible signal to the conversion server 200 by using the session SE2 (NO in S88 of FIG. 4). In this case, the MFP 10 newly tries the establishment processing for establishing a TCP session between the MFP 10 and the conversion server 200 (S90 of FIG. 4). As a result of the establishment processing, when a session SE5 is established (YES in S92 of FIG. 4), the MFP 10 transmits a partial data request for requesting data of the partial data, which has not been received yet, to the conversion server 200 by using the session SE5 (S94 of FIG. 4). As a result, the MFP 10 can appropriately receive the partial data. In the meantime, the MFP 10 requests data of the partial data already requested, which has not been received yet, from the conversion server 200 and does not request data other than the partial data already requested.

Also, the MFP 10 does not transmit the partial data request to the conversion server 200 after the MFP 10 shifts from the normal state to the error state until the MFP 10 returns to the normal state. According to this configuration, it is possible to avoid a situation where the partial data is received from the conversion server 200 even though the MFP 10 is at the error state.

In the meantime, the session SE2 may be forcibly ended since the conversion server 200 is at a communication impossible state (for example, a network failure). In this case, as shown in FIG. 7, after the error flag is switched from ON to OFF (YES in S82 of FIG. 4), the MFP 10 cannot transmit a reception possible signal to the conversion server 200 by using the session SE2 (NO in S88 of FIG. 4). Also, even though the MFP 10 newly tries the establishment processing for establishing a TCP session between the MFP 10 and the conversion server 200 (S90 of FIG. 4), it cannot establish a TCP session (NO in S92 of FIG. 4). In this case, the MFP 10 ends the processing without executing the second establishment processing and also transmitting the partial data request. When the conversion server 200 is at the communication impossible state, the MFP 10 cannot establish a TCP session even though it repeatedly executes the establishment processing. In the above configuration, when the MFP 10 tries the establishment processing one time but cannot establish a TCP session, the MFP does not newly execute the establishment processing and transmit the partial data request. According to this configuration, it is possible to prevent the MFP 10 from repeatedly executing the establishment processing even though it is not possible to establish a TCP session between the MFP 10 and the conversion server 200. Also, it is possible to avoid a situation where the MFP 10 executes the processing for transmitting the partial data request even though a TCP session is not established.

Effects of First Illustrative Embodiment

According to the configuration of this illustrative embodiment, the MFP 10 can receive the partial data, which could not be received since the MFP 10 has shifted to the error state, from the conversion server 200 after the MFP 10 shifts from the error state to the normal state. Therefore, when the data cannot be received while the MFP 10 is receiving the print data, it is possible to appropriately receive the print data.

Also, according to the configuration of this illustrative embodiment, the print data is sequentially acquired for each copy and the acquired print data is provided to the printing mechanism 16. According to this configuration, while the printing of N copies is being executed, the MFP 10 can appropriately execute the printing of N copies even though the print data is kept being stored in the data storage area 36.

(Correspondence Relation)

The relay server 100 and the conversion server 200 are examples of a data providing apparatus and the MFP 10 is an example of a printing apparatus. The partial data request that is transmitted in S58 of FIG. 4 is an example of a first partial data request and the processing of S58 in FIG. 4 is an example of a request processing. The partial data request that is transmitted in S94 of FIG. 4 is an example of a second partial data request. The processing from S64 to S78 of FIG. 4 is an example of a reception processing. The processing of S54 of FIG. 4 is an example of an acquisition processing. The heartbeat signal, the storing time period reset command and the storage request are examples of a storage request, respectively.

Second Illustrative Embodiment

A difference from the first illustrative embodiment is described. In this second illustrative embodiment, the processing that is performed by the MFP 10 when the MFP 10 shifts from the normal state to the error state while the MFP 10 is receiving the partial data is different from the first illustrative embodiment.

(Printing Processing Executed by MFP 10)

Figure 8:
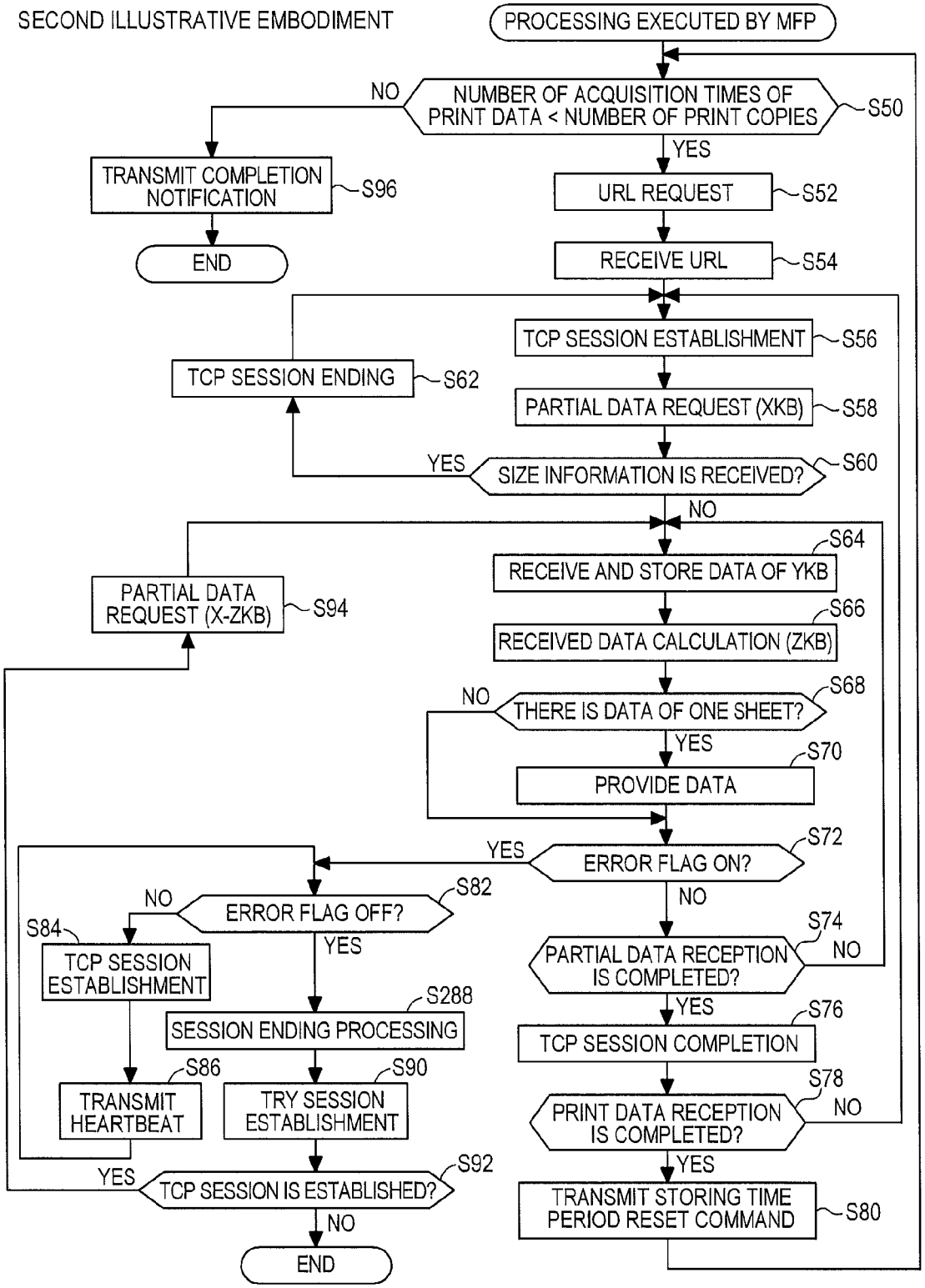
FIG. 8 is a flowchart of printing processing that is executed by the MFP of a second illustrative embodiment.

The printing processing that is executed by the MFP 10 of this illustrative embodiment is described with reference to FIG. 8. The same processing as the first illustrative embodiment is denoted with the same reference numerals.

When the error flag is OFF, i.e., the MFP 10 is at the normal state (YES in S82), the ending unit 58 executes the ending processing for ending the TCP session established in S56 (S288). The processing of S288 is the same as that of S62. In the meantime, the TCP session established in S56 may have been already ended at the time of execution of the processing of S288. In this case, the ending unit 58 tries to transmit a FIN packet to the conversion server 200 by using the TCP session established in S56. The ending processing includes the above processing that is executed even though the TCP session has been already ended. Then, the establishment unit 56 tries the processing of S90, i.e., the establishment processing of a new TCP session.

In this illustrative embodiment, unlike the first illustrative embodiment, when the MFP 10 shifts from the error state to the normal state (YES in S82), the ending unit 58 always executes the ending processing for ending the TCP session established in S56. That is, in this illustrative embodiment, when the MFP 10 shifts from the error state to the normal state, the TCP session is always ended (S288) and a new TCP session is established (S92).

Third Illustrative Embodiment

A difference from the first illustrative embodiment is described. In this third illustrative embodiment, the printing processing that is performed by the MFP 10 is different from the first illustrative embodiment.

(Printing Processing Executed by MFP 10)

Figure 9:
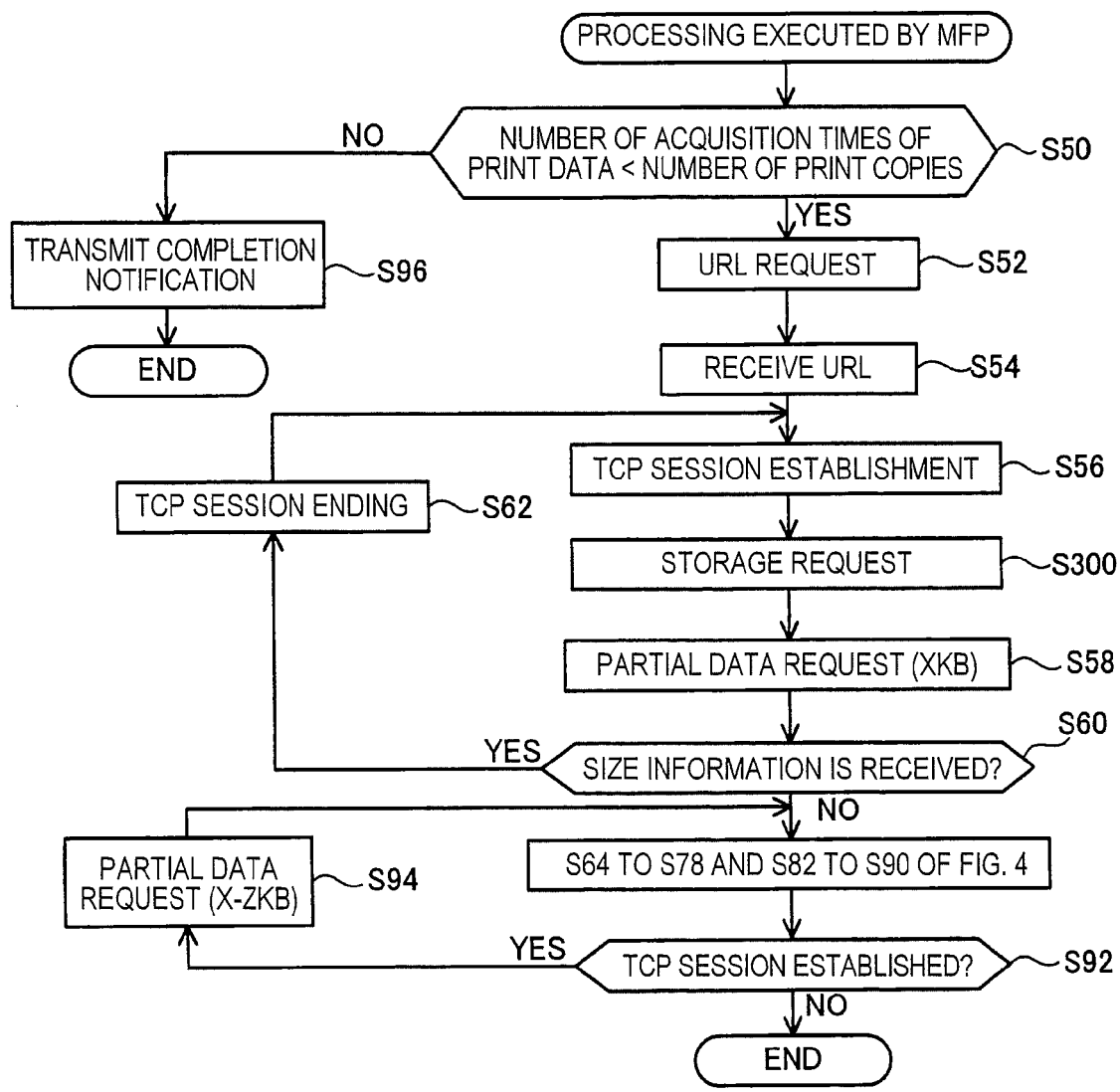
FIG. 9 is a flowchart of printing processing that is executed by the MFP of a third illustrative embodiment.

The printing processing that is executed by the MFP 10 of this illustrative embodiment is described with reference to FIG. 9. The same processing as the first illustrative embodiment is denoted with the same reference numerals. In S56, when a TCP session is established between the MFP 10 and the conversion server 200, the transmission unit 60 transmits a storage request to the conversion server 200 by using the TCP session established in S56 (S300). Specifically, the control unit 30 first uses the number of print copies received in S12 of FIG. 2 to thus calculate a storing time period after the print data is stored in the storage device 260 until the print data is erased. Specifically, the control unit 30 multiplies a predetermined time period (for example, 10 minutes) by the number of print copies, thereby calculating a storing time period. Then, the transmission unit 60 transmits a storage request including the calculated storing time period to the conversion server 200. In this illustrative embodiment, the control unit 30 does not execute the processing of S80 of FIG. 4.

Figure 5:
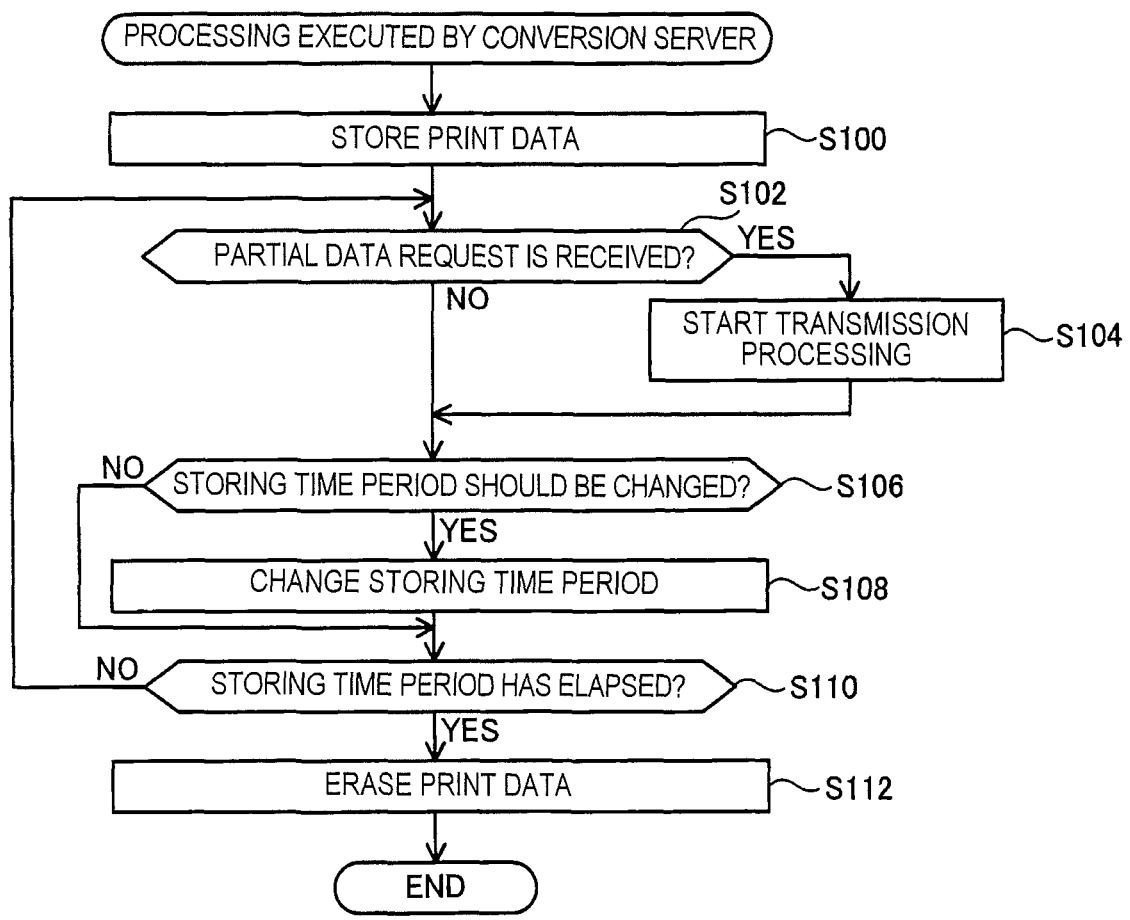
FIG. 5 is a flowchart of processing that is executed by a conversion server.

When the storage request is received from the MFP 10, the control unit 230 of the conversion server 200 determines in S106 of FIG. 5 that the storing time period should be changed (YES in S106). Then, the control unit 230 sets the storing time period included in the storage request to the timer of the storage device 260. Thereby, the storing time period is changed. The erasing unit 250 erases the print data when the time measured by the timer exceeds the received storing time period (S112 of FIG. 5). According to this configuration, it is possible to set an appropriate storing time period depending on the number of print copies. Thereby, it is possible to suppress a situation where the print data is kept being stored for a long time in the storage device 260 even though the MFP 10 has acquired the print data of N copies.

Fourth Illustrative Embodiment

A difference from the first illustrative embodiment is described. In this illustrative embodiment, the printing processing that is performed by the MFP 10 and the processing that is executed by the relay server 100 are different from the first illustrative embodiment.

In the printing processing, the MFP 10 does not execute the processing of S80 of FIG. 4. The other processing is the same as the printing processing of the first illustrative embodiment.

(Data Conversion Instruction Processing Executed by Relay Server)

Figure 10:
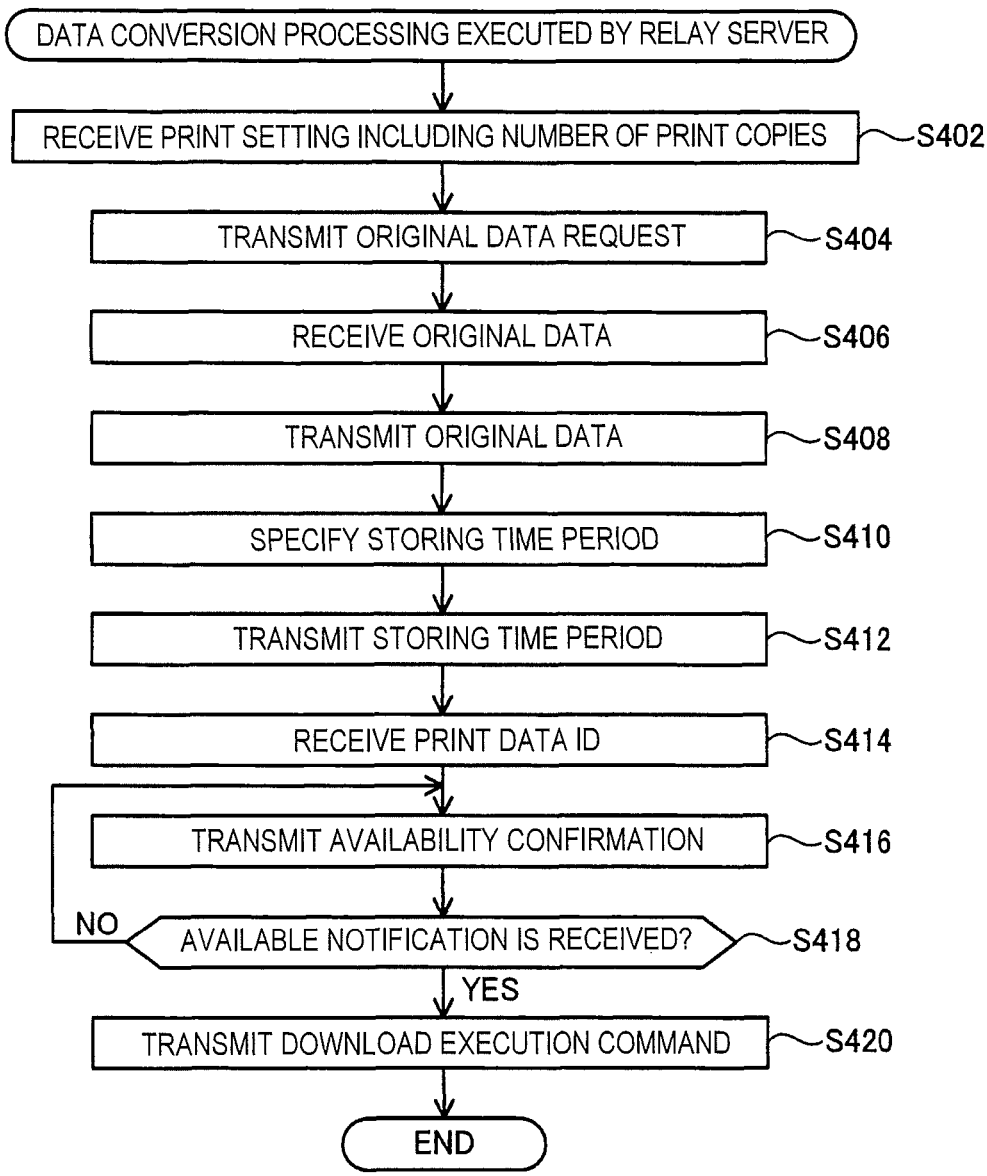
FIG. 10 is a flowchart of data conversion instruction processing that is executed by a relay server of a fourth illustrative embodiment.

The data conversion instruction processing that is executed by the relay server 100 of this illustrative embodiment is described with reference to FIG. 10. In S402, the copy number reception unit 150 receives a print setting from the MFP 10. The print setting includes the copy number information indicating the number of print copies received by the MFP 10. Then, in S404, the control unit 130 transmits a request for transmission of original data to the storage server 300 by using a URL of the original data to be printed included in the printing setting. Then, in S406, the control unit 130 receives the original data from the storage server 300. In S408, the control unit 130 transmits the original data to the conversion server 200.

Then, in S410, the specifying unit 152 specifies a storing time period by using the number of print copies included in the print setting received in S402. Specifically, the specifying unit 152 multiplies a predetermined time period (for example, 10 minutes) by the number of print copies received in S402, thereby calculating a storing time period. Then, in S412, the time period transmission unit 154 transmits a storage request including the specified storing time period to the conversion server 200.

When the storage request is received, the control unit 230 of the conversion server 200 determines in S106 of FIG. 5 that the storing time period should be changed (YES in S106), and sets the storing time period included in the storage request to the timer of the storage device 260. Thereby, the storing time period is changed. The erasing unit 250 erases the print data when the time measured by the timer exceeds the received storing time period (S112 of FIG. 5). According to this configuration, it is possible to suppress a situation where the print data is erased from the conversion server 200 before the print data of N copies is acquired.

After transmitting the storage request, in S414, the control unit 130 receives a print data ID identifying the print data from the conversion server 200. Then, in S416, the control unit 130 transmits an availability confirmation signal for confirming whether the print data can be downloaded or not to the conversion server 200. In S418, the control unit monitors whether an available notification, which indicates that the print data can be downloaded, is received from the conversion server 200, as a response to the availability confirmation signal. When an available notification is received (YES in S418), the control unit proceeds to S420. On the other hand, when an unavailable notification, which indicates that the print data cannot be downloaded, is received (NO in S418), the control unit returns to S416. In S420, the control unit transmits a download execution command to the MFP 10 and ends the conversion instruction processing.

While the present invention has been shown and described with reference to certain illustrative embodiments thereof, it will be understood by those skilled in the art that various changes in form and details may be made therein without departing from the spirit and scope of the invention as defined by the appended claims. For example, following modified embodiments are included.

Modified Embodiments (1) In the respective illustrative embodiments, when the partial data request is received, the conversion server 200 transmits the partial data to the MFP 10. However, the MFP 10 may acquire the partial data from the conversion server 200. That is, the MFP 10 may specify the partial data from the storage device 260 of the conversion server 200 and store the specified partial data in the data storage area 36 of the MFP 10. The configuration of this modified embodiment is also referred to that the conversion server 200 provides the data.

(2) In the respective illustrative embodiments, the MFP 10 receives the divided partial data from the conversion server 200. That is, each time when a part of the partial data is received, the MFP 10 transmits the reception possible signal to the conversion server 200. However, after transmitting the partial data request, the MFP 10 may receive the partial data from the conversion server 200 without transmitting the reception possible signal to the conversion server 200.

(3) In the respective illustrative embodiments, when the data of one print sheet is stored in the data storage area 36, the providing unit 54 provides the data to the printing mechanism 16. However, the timing at which the data is provided to the printing mechanism 16 is not limited thereto. For example, when the available capacity of the data storage area 36 becomes smaller than a predetermined threshold, the providing unit 54 may provide the data to the printing mechanism 16.

In this modified embodiment, the providing unit 54 may start to provide the print data of (M−1)-th copy to the printing mechanism 16 before the acquisition of the print data of M-th copy (M is an integer of 2 or larger) is completed. Also, the acquisition unit 52 may transmit the partial data request for acquiring the print data of M-th copy after the providing of the print data of (M−1)-th copy is completed.

(4) In the respective illustrative embodiments, in S94, the acquisition unit 52 transmits the partial data request for the MFP 10 receiving the data, which has not been received yet, i.e., the partial data of (X−Z) kB to the conversion server 200. However, the acquisition unit 52 may transmit a partial data request for the MFP 10 receiving data, which has not been received yet, and partial data including data other than the corresponding data to the conversion server 200.

(5) In the respective illustrative embodiments, when the data is provided to the printing mechanism 16, the control unit 30 erases the corresponding data from the data storage area 36. However, even when data is provided to the printing mechanism 16, the control unit 30 may not erase the corresponding data from the data storage area 36. In this case, when the data is received, the storage unit 62 may store the data in the data storage area 36 by writing the data over data that has been already provided to the printing mechanism 16.

(6) The printing apparatus is not limited to the MFP 10 having the printing, scan and FAX functions and may be a printer that can execute only the printing function.

(7) The conversion server 200 may be separately configured from the storage device 260. In this case, the conversion server 200 may be connected in communication with the storage device 260.

(8) In the respective illustrative embodiments, the CPU 32 of the MFP 10 executes the processing according to the programs 42, so that the functions of the respective units 50 to 62 are implemented. Instead of this, at least a part of the functions of the respective units 50 to 62 may be implemented by hardware such as a logical circuit and the like. Similarly, the CPU 132 of the relay server 100 executes the processing according to the programs 142, so that the functions of the respective units 150 to 154 are implemented. Instead of this, at least a part of the functions of the respective units 150 to 154 may be implemented by hardware such as a logical circuit and the like. Also, the CPU 232 of the conversion server 200 executes the processing according to the programs 242, so that the functions of the respective units 250 to 254 are implemented. Instead of this, at least a part of the functions of the respective units 250 to 254 may be implemented by hardware such as a logical circuit and the like.

(9) In the respective illustrative embodiments, the MFP 10 transmits the heartbeat signal to the conversion server 200 while it is at the error state. However, the MFP 10 may not transmit the heartbeat signal to the conversion server 200 while it is at the error state.

Also, the technical elements illustrated in the specification or drawings exhibit the technical availability individually or by a variety of combinations thereof and are not limited to the combinations defined in the claims at the time of filing the application. Also, the technique exemplified in the specification or drawings achieves a plurality of purposes at the same time and the achievement of any one purpose has the technical availability.

What is claimed is:

1. A printing apparatus configured to communicate with a data providing apparatus via the Internet, the printing apparatus comprising:
   a printing mechanism configured to execute a printing operation by using data;
   an operation unit configured to receive a user operation;
   a data memory;

a processor; and memory storing computer-readable instructions, the computer-readable instructions, when executed by the processor, causing the printing apparatus to perform:
- receiving a number of print copies N through an operation to the operation unit (N being an integer of 2 or larger);
- executing a printing operation for one print copy which includes:
  - acquiring first address information indicating a position of the print data on the Internet;
  - transmitting to the data providing apparatus a data request for the printing apparatus to acquire the print data, using the first address information;
  - receiving a first partial data of a plurality of partial data constituting the print data from the data providing apparatus in response to the data request;
  - storing the received first partial data of the plurality of partial data in an area of the data memory;
  - providing the first partial data stored in the data memory to the printing mechanism;
  - after the first partial data is provided, receiving a second partial data of the plurality of partial data from the data providing apparatus;
  - storing the received second partial data of the plurality of partial data in the area of the data memory, which has stored the first partial data having been already provided to the printing mechanism; and
  - providing the second partial data stored in the data memory to the printing mechanism; and
- determining whether a number of times the print data is acquired is smaller than the number of print copies N each time when acquiring of the print data for one print copy is completed by receiving the plurality of partial data, wherein when the determining determines that the number of times the print data is acquired is smaller than the number of print copies N, the printing apparatus is configured to execute the printing operation for next one print copy which includes:
- acquiring second address information indicating a position of the print data on the Internet, the second address information being different from the first address information;
- transmitting to the data providing apparatus the data request, using the second address information;
- receiving a third partial data of the plurality of partial data constituting the print data from the data providing apparatus in response to the data request; and
- storing the received third partial data of the plurality of partial data in the area of the data memory, which has stored the second partial data having been already provided to the printing mechanism, and
- when the determining determines that the number of times the print data is acquired is equal to the number of print copies N, the printing apparatus is configured to terminate the printing operation for the N print copies without transmitting the data request again.

2. The printing apparatus according to claim 1, wherein the providing starts to provide the print data of, (M−1)-th print copy (M being an integer of 2 or larger and N or smaller), to the printing mechanism before the acquiring the print data of M-th print copy is completed.

3. The printing apparatus according to claim 1, wherein the transmitting transmits the data request to acquire the print data of M-th print copy (M being an integer of 2 or larger and N or smaller) after the providing of the print data of (M−1)-th print copy to the printing mechanism is completed.

4. The printing apparatus according to claim 1, wherein the computer-readable instructions, when executed by the processor, cause the printing apparatus to further perform:
- transmitting to the data providing apparatus a storage request for storing the print data in the data providing apparatus for a time period longer than a predetermined storing time period.

5. The printing apparatus according to claim 4, wherein the transmitting transmits the storage request each time when the print data for one print copy is acquired.

6. The printing apparatus according to claim 4, wherein the computer-readable instructions, when executed by the processor, cause the printing apparatus to further perform:
- determining a specific storing time period for which the print data should be stored in the data providing apparatus by using the number of print copies N, and wherein the transmitting transmits the storage request including the determined specific storing time period to the data providing apparatus.

7. The printing apparatus according to claim 1, wherein when the determining determines that the number of times the print data is acquired is equal to N, the printing operation transmits completion information indicating that acquiring of the print data is completed, to the data providing apparatus.

8. The printing apparatus according to claim 1, wherein the printing operation further includes:
- erasing the first partial data stored in the area of the data memory when the providing of the first partial data is completed.

9. The printing apparatus according to claim 1, wherein the storing of the second partial data includes writing the second partial data over the first partial data stored in the area of the data memory.

10. The printing apparatus according to claim 1, wherein the first address information and the second address information include a character string related to time.

11. A non-transitory computer-readable storage medium storing computer-readable instructions, when executed by a processor of a printing apparatus configured to communicate with a data providing apparatus via the Internet and including a printing mechanism configured to execute a printing operation based on data, an operation unit configured to receive a user operation and a data memory, causing the printing apparatus to perform:
- receiving a number of print copies N through an operation to the operation unit (N being an integer of 2 or larger);
- executing a printing operation for one print copy which includes:
  - acquiring first address information indicating a position of the print data on the Internet;
  - transmitting to the data providing apparatus a data request for the printing apparatus to acquire the print data, using the first address information;
  - receiving a first partial data of a plurality of partial data constituting the print data from the data providing apparatus in response to the data request;

storing the received first partial data of the plurality of partial data in an area of the data memory;

providing the first partial data stored in the data memory to the printing mechanism;

after the first partial data is provided, receiving a second partial data of the plurality of partial data from the data providing apparatus; and storing the received second partial data of the plurality of partial data in the area of the data memory, which has stored the first partial data having been already provided to the printing mechanism; and determining whether a number of times the print data is acquired is smaller than the number of print copies N each time when acquiring of the print data for one print copy is completed by receiving the plurality of partial data, wherein when the determining determines that the number of times the print data is acquired is smaller than the number of print copies N, the printing apparatus is configured to execute the printing operation for next one print copy which includes:

acquiring second address information indicating a position of the print data on the Internet, the second address information being different from the first address information;

transmitting to the data providing apparatus the data request; using the second address information;

receiving a third partial data of the plurality of partial data constituting the print data from the data providing apparatus in response to the data request; and storing the received third partial data of the plurality of partial data in the area of the data memory, which has stored the second partial data having been already provided to the printing mechanism, and when the determining determines that the number of times the print data is acquired is equal to the number of print copies N, the printing apparatus is configured to terminate the printing operation for the N print copies without transmitting the data request again.

* * * * *

UNITED STATES PATENT AND TRADEMARK OFFICE
CERTIFICATE OF CORRECTION

| | |
|---|---|
| PATENT NO. | : 9,542,131 B2 |
| APPLICATION NO. | : 14/038103 |
| DATED | : January 10, 2017 |
| INVENTOR(S) | : Hiroyuki Hayashi |

It is certified that error appears in the above-identified patent and that said Letters Patent is hereby corrected as shown below:

In the Claims

It Should Read:
Column 22 (Claim 11, Line 6) request using the second address information;

Signed and Sealed this
Eighth Day of August, 2017

Joseph Matal
*Performing the Functions and Duties of the*
*Under Secretary of Commerce for Intellectual Property and*
*Director of the United States Patent and Trademark Office*